June 28, 1938. C. BREER 2,121,854
WEATHERSTRIP
Filed March 30, 1936
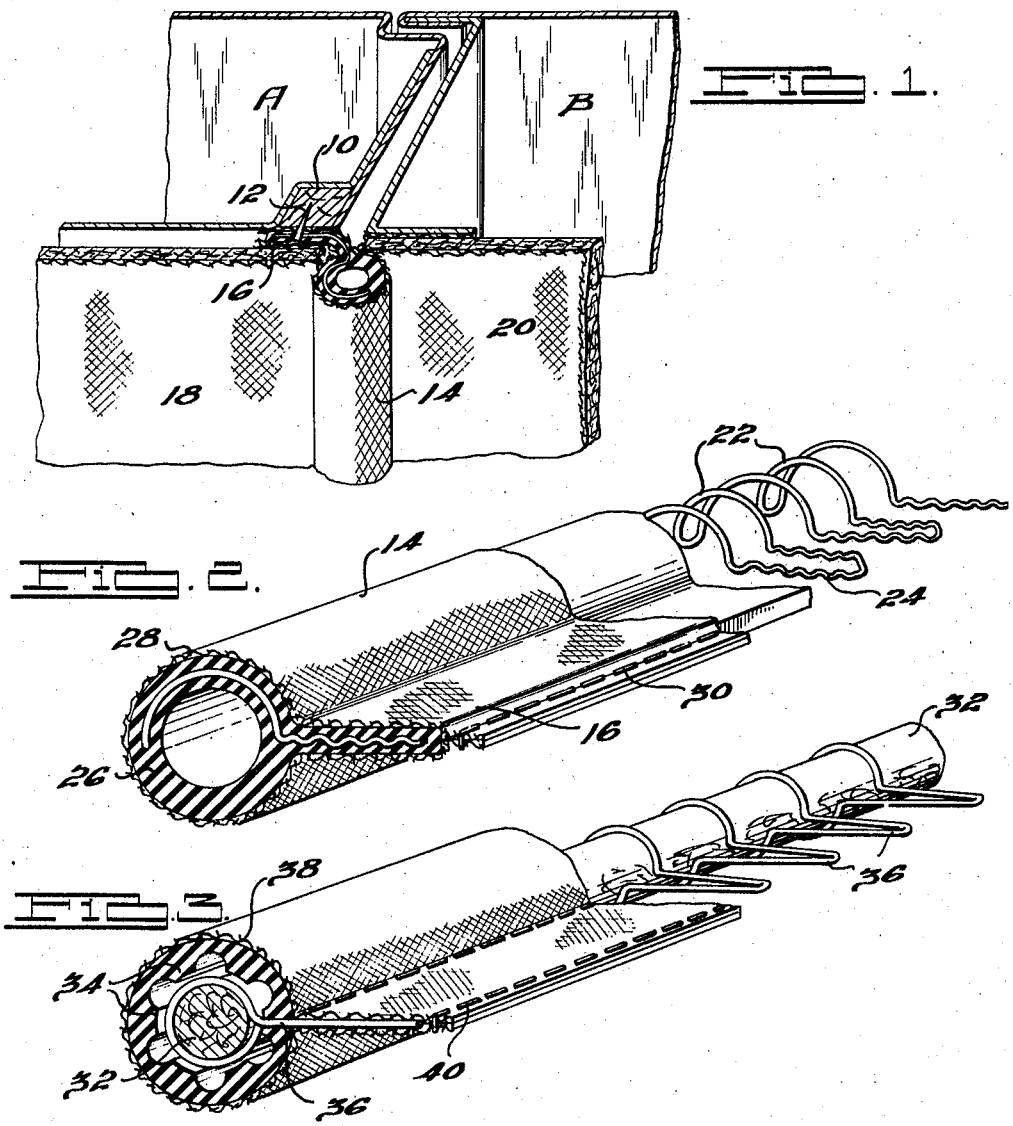
INVENTOR.
Carl Breer:
BY
Harness, Lind, Patee & Harris
ATTORNEYS.

Patented June 28, 1938

2,121,854

UNITED STATES PATENT OFFICE 2,121,854

WEATHERSTRIP

Carl Breer, Grosse Pointe Park, Mich., assignor to Chrysler Corporation, Highland Park, Mich., a corporation of Delaware Application March 30, 1936, Serial No. 71,619

1 Claim. (Cl. 20—69)

This invention relates to a weatherstrip and more particularly to a weatherstrip especially adapted for use on motor vehicle bodies to seal the opening around the doors or windows.

An object of the invention is to provide a weatherstrip which is strong, inherently resilient, and inexpensive to manufacture.

Another object of the invention is to provide a weatherstrip, the parts of which are easily assembled and retained in assembled position by stitching.

A further object of the invention is to provide a weatherstrip which is free to bend laterally in applying the same to a curved opening.

A further object of the invention is to provide a weatherstrip which has sufficient resiliency to cause it to tightly engage the door or window for sealing purposes and yet adapted to take a permanent set when bent beyond its elastic limit, so that in applying the weatherstrip to an opening it may be bent beyond its elastic limit to conform to any irregularities around the opening, and after being bent to that position possesses sufficient resiliency to flex within given limits.

More specifically stated, the invention consists in applying a resilient wire to the central portion of a cushioning part of the weatherstrip and extending the wire into an attaching portion so that the parts are connected together in such a manner that relative bending movement is resiliently resisted.

Other objects and advantages of the invention will be more fully understood from the following description taken in connection with the accompanying drawing, in which:

Fig. 1 is a perspective view, parts being broken away and in section, of one application of the device as applied to an automobile door opening.

Fig. 2 is a perspective view of the weatherstrip alone, parts thereof being broken away and in section.

Fig. 3 is a perspective view corresponding to Fig. 2 but showing a modification of the weatherstrip.

Referring to the drawing, I have illustrated a portion of the automobile body frame at A and a door at B. The frame is provided with a tacking insert 10 to which the weatherstrip is secured such as by tacks 12.

The weatherstrip comprises a cushioning member 14 and an attached flanged tacking strip 16, the latter being secured to the tacking insert 10. As illustrated, a panel member 18 is secured to the frame A overlapping the flanged tacking strip 16. The inner panel of the door is shown at 20.

In the form of my invention show in Fig. 2, I have preformed a wire into a series of continuous loops, a portion of which is formed into semi-circular ribs 22. Another portion thereof is formed with flat extending portions 24 lying substantially in a flat plane. To this preformed wire I apply a coating of resilient material such as rubber. The rubber may be molded to the opposite sides of the wire and forms a continuous tubular portion as shown at 26 with the laterally extending portion 16 which forms a securing strip. If desired, a fabric covering 28 may be applied to the resilient material either by cementing or vulcanizing to the rubber during the molding operation. The outer edges of the fabric member 28 may be stitched as at 30 if the fabric material is not vulcanized to the molded rubber. If desired, the laterally extending portions 24 of the wire may be crimped, as shown in Fig. 2, thus pro..ding a larger horizontal area in the flat plane as shown in Fig. 2, which will then provide a larger horizontal contacting area for the securing portion 16. This crimping also more securely unites the rubber and the iron.

Fig. 3 shows a modified form of the invention wherein the wire is looped around a central core 32, preferably formed from paper or the like. A resilient tubular cover is loosely placed around the core and wire and is provided with a plurality of radially extending ribs 34 on the inner periphery of the tubular member. The tubular member is slotted as at 36 through which the core 32 and wire are inserted. To this tubular member may be applied a fabric cover 38 which is stitched as at 40 along the outwardly projecting portion of the wire.

In order to give the parts more rigidity and at the same time provide sufficient flexibility, I have preformed a wire into loops so that it may have a portion partially coiled within a tubular member 26 and another portion extending laterally into the attaching portion 16. It is important to select a wire having a deflection characteristic which, when bent wihin limits, is elastic but when bent beyond its limits takes a base set and is elastic from that bent position. This is important when the weatherstrip is applied to an irregular surface. For example, the strip may be manually bent beyond its elastic limit to fit an irregular surface but when so bent it is elastic from that bent position. I have found that a wire suitable for this purpose should have an elastic limit between 250,000 lbs. per square inch and 350,000 lbs. per square inch and may be formed from what is commonly termed music wire having a diameter of approximately one sixty-fourth of an inch.

By forming the wire into zigzag shape it is readily possible to bend the weatherstrip in any direction such as is required in securing the strip to a curved surface or in going around a corner of the door opening or the like.

Although but several specific embodiments of the invention have herein been shown and described, it will be understood that various changes in the size, shape and arrangement of parts may be made without departing from the spirit of my invention.

What is claimed is:

A weatherstrip comprising a continuous strip of pliable material having a hollow tubular portion and an integral flat portion extending radially from the outer side of said tubular portion, a reinforcing member in said flat portion and in only a part of the wall of said tubular portion to render one side of said tubular portion more rigid than its opposite side, said reinforcing member being formed from a continuous resilient wire having reversely bent portions forming a plurality of spaced substantially parallel ribs extending transversely of said reinforcing member and in alignment longitudinally thereof, a lateral portion of said reinforcing member having a part of each rib curved and conforming to the curvature of the reinforced part of the wall of said tubular portion and the other lateral portion of said reinforcing member having a part of each rib in a common plane substantially radial to the curved part of the ribs, said reinforcing member being entirely embedded in said pliable material with the flat portion of said reinforcing member in the flat portion of said pliable material and the curved portion of said reinforcing member in only the reinforced part of the wall of said tubular portion to form one side of said tubular portion relatively more rigid than the other side thereof, and a fabric covering over said tubular portion and the flat portion of said pliable material.

CARL BREER.